(12) United States Patent
Lee et al.

(10) Patent No.: US 11,648,950 B2
(45) Date of Patent: May 16, 2023

(54) METHOD AND DEVICE FOR MEASURING A SLOPE ANGLE OF A VEHICLE

(71) Applicants: HYUNDAI MOTOR COMPANY, Seoul (KR); KIA MOTORS CORPORATION, Seoul (KR)

(72) Inventors: Tae Suk Lee, Yongin-si (KR); Young Ho Jung, Seoul (KR); Seongkyu Park, Suwon-si (KR); Min Young Jung, Suwon-si (KR); Jung Hwan Bang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 244 days.

(21) Appl. No.: 17/108,454

(22) Filed: Dec. 1, 2020

(65) Prior Publication Data
US 2022/0055630 A1    Feb. 24, 2022

(30) Foreign Application Priority Data
Aug. 21, 2020    (KR) .................. 10-2020-0105388

(51) Int. Cl.
*B60W 40/076* (2012.01)
*B60W 40/107* (2012.01)
*B60W 40/105* (2012.01)

(52) U.S. Cl.
CPC ........ *B60W 40/076* (2013.01); *B60W 40/105* (2013.01); *B60W 40/107* (2013.01); *B60W 2520/105* (2013.01)

(58) Field of Classification Search
CPC ............ B60W 40/076; B60W 40/105; B60W 40/107; B60W 30/18054;
(Continued)

(56) References Cited

U.S. PATENT DOCUMENTS 9,311,761 B1 *     4/2016   Ye ................... B60W 40/00
2010/0292915 A1 * 11/2010  Ishigami .............. G01C 21/26
                                                          701/532

(Continued)

FOREIGN PATENT DOCUMENTS

KR        100792908 B1    1/2008

*Primary Examiner* — Jeff A Burke
*Assistant Examiner* — Zachary Joseph Wallace
(74) *Attorney, Agent, or Firm* — Lempia Summerfield Katz LLC

(57) ABSTRACT

A method for measuring a slope angle of a vehicle includes, by a controller: determining whether or not a speed of the vehicle is 0 based on a speed signal received from a vehicle speed sensor of the vehicle; measuring an extremal value measured first, an extremal value measured second, and an extremal value measured third among extremal values of an output signal of an acceleration sensor detecting a signal corresponding to the slope angle of the vehicle when the speed of the vehicle is 0; verifying whether or not the measured three extremal values satisfy conditions of the extremal values based on reference conditions of each of the extremal values; estimating a steady state value of the output signal of the acceleration sensor, based on the extremal values measured first and second among the verified three extremal values and a dynamic characteristic parameter of the vehicle or based on the verified three extremal values; and converting the steady state value into the slope angle of the vehicle. The output signal of the acceleration sensor has a damped free vibration waveform.

8 Claims, 3 Drawing Sheets

(58) Field of Classification Search
CPC ..... B60W 2050/0027; B60W 2520/04; B60W 2520/10; B60W 2520/105
See application file for complete search history.

(56) References Cited

U.S. PATENT DOCUMENTS

| | | | | |
|---|---|---|---|---|
| 2014/0309803 | A1* | 10/2014 | You | B60W 40/076 |
| | | | | 701/1 |
| 2015/0345630 | A1* | 12/2015 | Wang | F16H 61/66259 |
| | | | | 474/11 |
| 2016/0068165 | A1* | 3/2016 | Chen | B60W 40/11 |
| | | | | 701/32.9 |
| 2016/0332633 | A1* | 11/2016 | Raffone | B60W 40/13 |
| 2017/0166211 | A1* | 6/2017 | Eom | B60W 10/18 |
| 2019/0135293 | A1* | 5/2019 | Kotteri | B60W 30/143 |
| 2021/0070305 | A1* | 3/2021 | Grother | B60W 30/143 |
| 2021/0070360 | A1* | 3/2021 | Lee | B60W 40/09 |

* cited by examiner

METHOD AND DEVICE FOR MEASURING A SLOPE ANGLE OF A VEHICLE

CROSS-REFERENCE TO RELATED APPLICATION

This application claims priority to and the benefit of Korean Patent Application No. 10-2020-0105388 filed in the Korean Intellectual Property Office on Aug. 21, 2020, the entire contents of which are incorporated herein by reference.

BACKGROUND

(a) Field of the Disclosure

The present disclosure relates to a vehicle. More particularly, the present disclosure relates to a method and a device for measuring a slope angle of a vehicle.

(b) Description of the Related Art

In the field of a vehicle, a slope angle of the vehicle (a slope angle of a driving road) has been measured and has been widely utilized for vehicle control. As an example, the slope angle needs to be measured in order to prevent the vehicle from slipping back on a ramp. The measured slope angle has also been widely used for idle stop control (determination and control of idle stop entry/release points in time) for preventing the vehicle from slipping back.

The slope angle of the vehicle (the slope angle of the driving road) is generally measured using an acceleration sensor. However, there are many errors in the slope angle of the vehicle measured using the acceleration sensor.

In other words, an output signal of the acceleration sensor is transmitted through an electric circuit receiving the output signal and related hardware. This process is accompanied by high-frequency noise and it is difficult to measure a correct signal in real time due to an inappropriate signal processing procedure.

Since there are many errors in the slope angle measured by the acceleration sensor as described above, a problem occurs in that reliability of a logic in the vehicle that uses the slope angle measured by the acceleration sensor in real time is not guaranteed.

In particular, it is difficult to ensure reliability of a slope slip-back prevention logic that uses slope information. There are also many restrictions in correctly determining the idle stop entry/release points in time of the vehicle.

Because of such characteristics, a slope angle estimation algorithm applied in the related art is configured to determine the slope angle at a point in time when a certain time elapses after the vehicle is stopped, such that an output value of the acceleration sensor becomes stable. However, since it takes time until the output value of the acceleration sensor becomes stable, rapid vehicle control may not be performed.

The above information disclosed in this Background section is only to enhance understanding of the background of the disclosure. Therefore the Background section may contain information that does not form the prior art that is already known in this country to a person of ordinary skill in the art.

SUMMARY

The present disclosure has been made in an effort to provide a method and a device for measuring a slope angle of a vehicle. The method and device having advantages of quickly and accurately measuring or detecting the slope angle of the vehicle using extremal values of an output signal of an acceleration sensor and a dynamic characteristic parameter of the vehicle or using the extremal values after the vehicle is stopped and before the output signal of the acceleration sensor is stabilized.

An embodiment of the present disclosure provides a method for measuring a slope angle of a vehicle. The method includes: determining, by a controller, whether or not a speed of the vehicle is 0 based on a speed signal received from a vehicle speed sensor of the vehicle; measuring, by the controller, an extremal value measured first, an extremal value measured second, and an extremal value measured third among extremal values of an output signal of an acceleration sensor detecting a signal corresponding to the slope angle of the vehicle when the speed of the vehicle is 0; verifying, by the controller, whether or not the measured three extremal values satisfy conditions of the extremal values based on reference conditions of each of the extremal values; estimating, by the controller, a steady state value of the output signal of the acceleration sensor, based on the extremal values measured first and second among the verified three extremal values and a dynamic characteristic parameter of the vehicle or based on the verified three extremal values; and converting, by the controller, the steady state value into the slope angle of the vehicle, wherein the output signal of the acceleration sensor has a damped free vibration waveform.

The controller may determine that the reference conditions are satisfied when: a value obtained by subtracting a generation time of the extremal value measured first among the measured three extremal values from a generation time of the extremal value measured second among the measured three extremal values is ½ of a damped free vibration period of the damped free vibration waveform; a value obtained by subtracting a generation time of the extremal value measured second from a generation time of the extremal value measured third among the measured three extremal values is ½ of the damped free vibration period; a magnitude of the extremal value measured first is larger than a magnitude of the extremal value measured second; and the magnitude of the extremal value measured second is larger than a magnitude of the extremal value measured third.

The controller may calculate the dynamic characteristic parameter of the vehicle using the extremal values measured first and second among the verified three extremal values.

The controller may calculate the dynamic characteristic parameter of the vehicle by dividing a magnitude of the extremal value measured second among the verified three extremal values by a magnitude of the extremal value measured first among the verified three extremal values.

Another embodiment of the present disclosure provides a device for measuring a slope angle of a vehicle. The device includes: a vehicle speed sensor detecting a speed of the vehicle; an acceleration sensor detecting a signal corresponding to the slope angle of the vehicle; and a controller determining whether or not the speed of the vehicle is 0 based on a speed signal received from the vehicle speed sensor of the vehicle. When the speed of the vehicle is 0, the controller measures an extremal value measured first, an extremal value measured second, and an extremal value measured third among extremal values of an output signal of the acceleration sensor having a damped free vibration waveform. The controller also verifies whether or not the measured three extremal values satisfy conditions of the extremal values based on reference conditions of each of the extremal values. The controller also estimates a steady state value of the output signal of the acceleration sensor, based on the extremal values measured first and second among the verified three extremal values and a dynamic characteristic parameter of the vehicle or based on the verified three extremal values. The controller also converts the steady state value into the slope angle of the vehicle.

The controller may determine that the reference conditions are satisfied when: a value obtained by subtracting a generation time of the extremal value measured first among the measured three extremal values from a generation time of the extremal value measured second among the measured three extremal values is ½ of a damped free vibration period of the damped free vibration waveform; a value obtained by subtracting a generation time of the extremal value measured second from a generation time of the extremal value measured third among the measured three extremal values is ½ of the damped free vibration period; a magnitude of the extremal value measured first is larger than a magnitude of the extremal value measured second; and the magnitude of the extremal value measured second is larger than a magnitude of the extremal value measured third.

The controller may calculate the dynamic characteristic parameter of the vehicle using the extremal values measured first and second among the verified three extremal values.

The controller may calculate the dynamic characteristic parameter of the vehicle by dividing a magnitude of the extremal value measured second among the verified three extremal values by a magnitude of the extremal value measured first among the verified three extremal values.

The method and the device for measuring a slope angle of a vehicle according to embodiments of the present disclosure described above may quickly and accurately measure the slope angle of the vehicle using the extremal values of the output signal of the acceleration sensor and the dynamic characteristic parameter of the vehicle or using the extremal values after the vehicle is stopped and before the output signal of the acceleration sensor is stabilized.

In addition, in an embodiment of the present disclosure, the slope angle of the vehicle may be measured using the verified extremal values, and reliability of the measurement of the slope angle may thus be improved.

BRIEF DESCRIPTION OF THE DRAWINGS

A brief description of the drawings is provided in order to allow the drawings used in a detailed description of the present disclosure to be sufficiently understood.

DETAILED DESCRIPTION OF THE EMBODIMENTS

Figure 1:
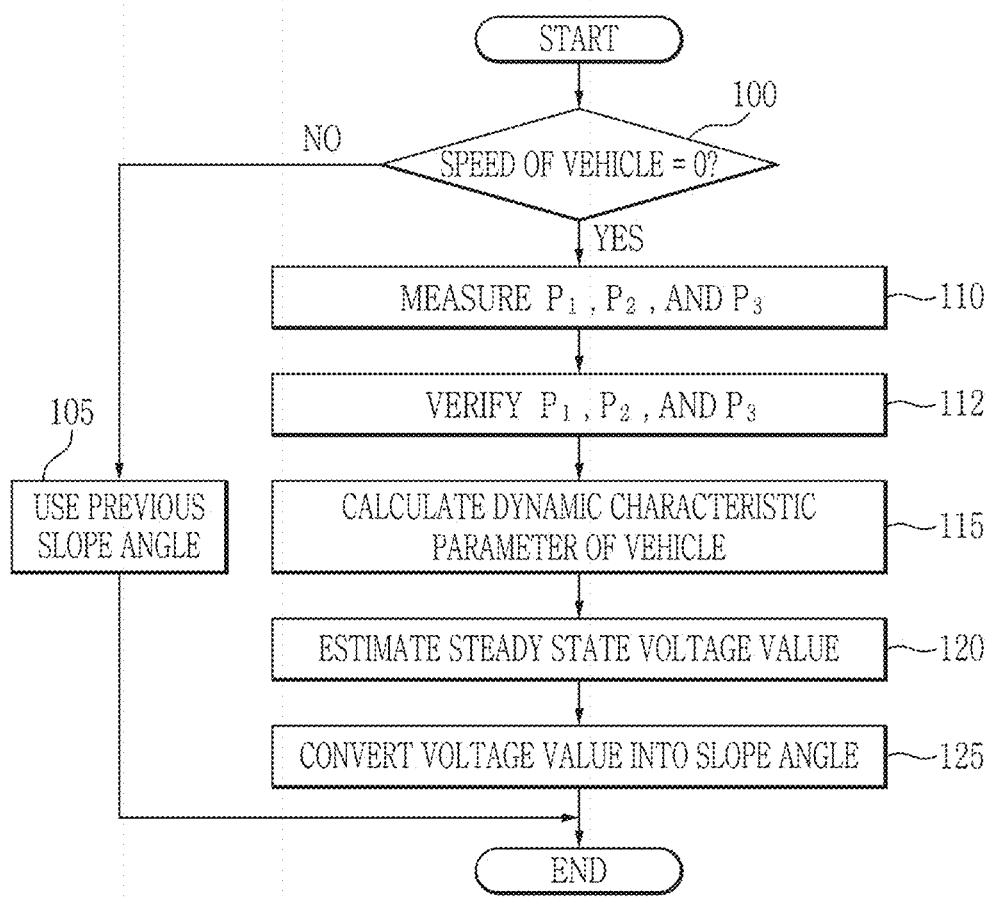
FIG. 1 is a flowchart for describing a method for measuring a slope angle of a vehicle according to an embodiment of the present disclosure.

In order to sufficiently understand the present disclosure and objects accomplished by executing the present disclosure, reference should be made to the accompanying drawings illustrating embodiments of the present disclosure and contents described in the accompanying drawings.

Hereinafter, the present disclosure is described in detail by describing embodiments of the present disclosure with reference to the accompanying drawings. Further, in describing the present disclosure, well-known configurations or functions are not described in detail since they may unnecessarily obscure the gist of the present disclosure. Throughout the drawings, the same reference numerals will denote the same components.

Terms used in the present specification are used only in order to describe specific embodiments rather than limiting the present disclosure. Singular forms are to include plural forms unless the context clearly indicates otherwise. It should be understood that the terms "include" or "have" used in the present specification specify the presence of features, numerals, steps, operations, components, parts, and the like mentioned in the present specification, or a combination thereof, but do not preclude the presence or addition of one or more other features, numerals, steps, operations, components, parts, or a combination thereof.

Throughout the present specification, when any one portion is referred to as being "connected to" another portion, it means that any one portion and another portion are "directly connected to" each other or are "electrically or mechanically connected to" each other with another component interposed therebetween.

Unless being defined otherwise, the terms used in the present specification including technical and scientific terms have the same meanings as those that are generally understood by a person of ordinary skill in the art. It should be understood that the terms defined by a dictionary are identical with the meanings within the context of the related art. The terms should not be ideally or excessively formally defined unless the context clearly dictates otherwise.

A vehicle according to the related art may erroneously determine a slope angle due to a vibration of an output value of a tilt angle sensor or an acceleration sensor that detects a signal corresponding to the slope angle of the vehicle. The vibration of the output value of the acceleration sensor may be generated by pitching of the vehicle generated when the vehicle is stopped.

Figure 2:
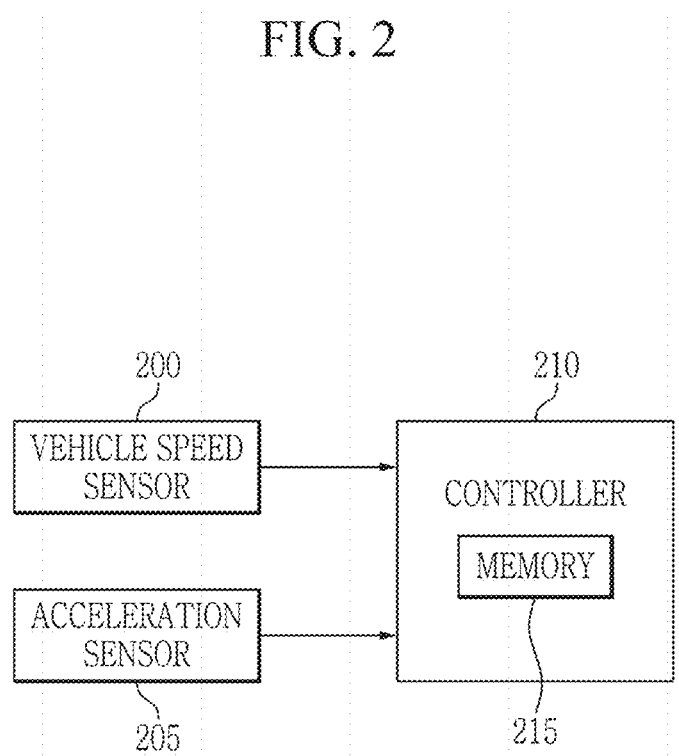
FIG. 2 is a block diagram for describing a device for measuring a slope angle of a vehicle to which the method for measuring a slope angle of a vehicle shown in FIG. 1 is applied.
Figure 3:
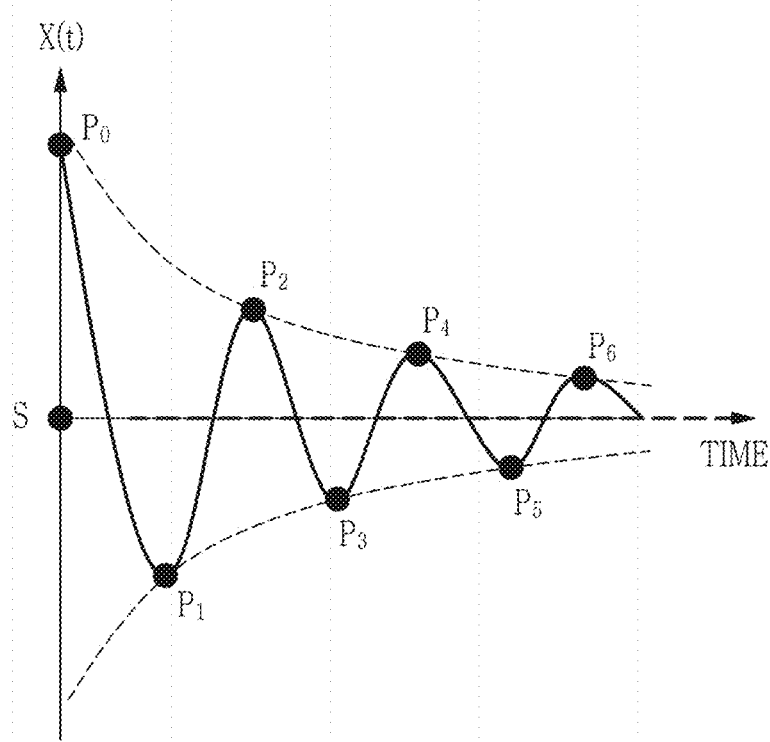
FIG. 3 is a graph for describing an output signal of an acceleration sensor shown in FIG. 2.

FIG. 1 is a flowchart for describing a method for measuring a slope angle of a vehicle according to an embodiment of the present disclosure. FIG. 2 is a block diagram for describing a device for measuring a slope angle of a vehicle to which the method for measuring a slope angle of a vehicle shown in FIG. 1 is applied. FIG. 3 is a graph for describing an output signal of an acceleration sensor shown in FIG. 2.

Referring to FIGS. 1-3, in determining step 100, a controller 210 may determine whether or not a speed of the vehicle is 0 (zero) based on a speed signal received from a vehicle speed sensor 200 of the vehicle. The vehicle speed sensor 200 may be mounted on a wheel of the vehicle.

When the vehicle speed is not 0, the method for measuring a slope angle of a vehicle, which is a process, may proceed to step 105. When the vehicle speed is 0, the method for measuring a slope angle of a vehicle, which is a process, may proceed to measuring step 110.

As shown in FIG. 2, the device for measuring a slope angle of a vehicle includes the vehicle speed sensor 200 detecting a speed of the vehicle, an acceleration sensor (or a tilt angle sensor) 205 detecting a signal corresponding to a slope angle of the vehicle (or an acceleration signal of the vehicle), and a controller 210.

The controller 210, which is an electronic control unit (ECU), may control an entire operation of the vehicle. The controller 210 may be, for example, one or more microprocessors operated by a program (control logic) or hardware (for example, a microcomputer) including the microprocessors. The program may include a series of instructions for performing the method of measuring a slope angle of a vehicle according to an embodiment of the present disclosure. The instructions may be stored in a memory 215 included in the controller 210.

According to step 105 shown in FIG. 1, the controller 210 may use the slope angle measured by the method of measuring a slope angle of a vehicle according to an embodiment of the present disclosure as a slope angle of the vehicle, before a time when it is determined whether or not the speed of the vehicle is 0.

According to step 110, the controller 210 may measure (or detect) an extremal value (for example, a minimum value) $P_1$ measured first, an extremal value (for example, a maximum value) $P_2$ measured second, and an extremal value (for example, a minimum value) $P_3$ measured third among extremal values of an output signal of the acceleration sensor 205 detecting the signal corresponding to the slope angle (an angle of slope or an angle of inclination) of the vehicle. For example, the controller 210 may calculate three extremal values $P_1$, $P_2$, and $P_3$ using output signal values at which a gradient (first order derivative of a function corresponding to the output signal) of the output signal of the acceleration sensor 205 is changed from a positive value to a negative value or is changed from a negative value to a positive value.

The output signal of the acceleration sensor 205 is shown in FIG. 3.

Referring to FIG. 3, the output signal $X(t)$ of the acceleration sensor 205 is generated when the vehicle is stopped, has a damped free vibration waveform, and may be expressed by the following equation. For example, the output signal $x(t)$ of the acceleration sensor 205 may have a voltage value.

$$X(t)=A \cdot e^{-\alpha t} \cdot \cos(\omega_d \cdot t + \varphi) + S$$

In the above equation, A is an amplitude, $\alpha$ is a damping coefficient, $\omega_d$ is a damped natural frequency, $\varphi$ is an initial phase (for example 0 degree), and S may indicate a steady state value of $X(t)$.

In the above equation, when a time t is ½ of a damped free vibration period of the damped free vibration waveform, the output signal $X(t)$ may have the extremal value $P_1$ measured first, and when a time t is the damped free vibration period, the output signal $X(t)$ may have the extremal value $P_2$ measured second.

According to step 112, in order to increase reliability of the extremal values $P_1$, $P_2$, and $P_3$, the controller 210 may verify whether or not the measured three extremal values $P_1$, $P_2$, and $P_3$ satisfy conditions (or definitions) of the extremal values based on reference conditions of each of the extremal values.

The controller 210 may determine that the reference conditions are satisfied when: a value obtained by subtracting a generation time of the extremal value $P_1$ measured first from a generation time of the extremal value $P_2$ measured second is ½ of the damped free vibration period of the output signal $X(t)$; a value obtained by subtracting the generation time of the extremal value $P_2$ measured second from a generation time of the extremal value $P_3$ measured third is ½ of the damped free vibration period of the output signal $X(t)$; a magnitude of the extremal value $P_1$ measured first is larger than a magnitude of the extremal value $P_2$ measured second; and a magnitude of the extremal value $P_2$ measured second is larger than a magnitude of the extremal value $P_3$ measured third.

According to step 115, the controller 210 may calculate a dynamic characteristic parameter of the vehicle using the extremal values $P_1$ and $P_2$ measured first and second among the verified three extremal values $P_1$, $P_2$, and $P_3$.

The dynamic characteristic parameter of the vehicle may be a value changed according to characteristics of the vehicle (or a vehicle body), for example, a mass of the vehicle or stiffness of the vehicle. The dynamic characteristic parameter may be determined using the extremal values. For example, the controller 210 may calculate the dynamic characteristic parameter of the vehicle by dividing the magnitude of the extremal value $P_2$ measured second by the magnitude of the extremal value $P_1$ measured first. The controller 210 may store (update) the dynamic characteristic parameter in the memory 215.

According to step 120, the controller 210 may estimate (or calculate) a steady state value (for example, a steady state voltage value) of the output signal of the acceleration sensor 205, based on the extremal values $P_1$ and $P_2$ measured first and second among the verified three extremal values and the dynamic characteristic parameter of the vehicle or based on the verified three extremal values $P_1$, $P_2$, and $P_3$. In order to more accurately detect the slope angle of the vehicle, the controller 210 may estimate the steady state value of the output signal of the acceleration sensor 205 based on the verified three extremal values $P_1$, $P_2$, and $P_3$.

For example, the controller 210 may estimate the steady state value S of the output signal of the acceleration sensor 205 using the following equation that uses the extremal values $P_1$ and $P_2$ measured first and second among the verified three extremal values and the dynamic characteristic parameter of the vehicle.

$$S = \frac{P_2 + C \cdot P_1}{1 + C}$$

In the above equation, C may be the dynamic characteristic parameter of the vehicle.

For example, the controller 210 may estimate the steady state value S of the output signal of the acceleration sensor 205 using the following equation that uses the verified three extremal values $P_1$, $P_2$, and $P_3$.

$$S = \frac{P_2^2 - P_1 \cdot P_3}{-P_1 + 2 \cdot P_2 - P_3}$$

In a case where a value of a denominator of the equation that uses the verified three extremal values $P_1$, $P_2$, and $P_3$ is close to 0, the steady state value S of the output signal of the acceleration sensor 205 may be estimated using the equation that uses the extremal values $P_1$ and $P_2$ measured first and second among the verified three extremal values and the dynamic characteristic parameter of the vehicle.

According to step 125, after step 120, the controller 210 may convert the steady state value into the slope angle of the vehicle. The slope angle of the vehicle corresponding to the steady state value may be determined by a test (or an experiment) and may be stored in the memory 215.

For example, the controller 210 may use the slope angle of the vehicle in order to control (or release) an idle stop and go system of the vehicle so that the vehicle does not slip back on a ramp. The idle stop and go system may stop an engine when the vehicle is stopped for a certain time and automatically start the engine to start the vehicle when a vehicle driver takes his/her foot off a brake pedal and steps on an accelerator pedal, in order to improve fuel efficiency of the vehicle.

Components, "~ units", blocks, or modules used in an embodiment of the present disclosure may be implemented by software such as tasks, classes, sub-routines, processes, objects, execution threads, or programs performed in a predetermined region on a memory or hardware such as a field-programmable gate array (FPGA) or an application-specific integrated circuit (ASIC) and may be implemented by a combination of the software and the hardware. The components, the "~ units", or the like, may be included in a computer readable storage medium or may be partially dispersed and distributed in a plurality of computers.

Hereinabove, embodiments have been disclosed in the drawings and the specification. Specific terms have been used in the present specification, but these specific terms are used only in order to describe the present disclosure and are not used in order to limit the meaning or limit the scope of the present disclosure as disclosed in the claims. Therefore, a person of ordinary skill in the art should understand that various modifications and equivalent embodiments are possible from the present disclosure. Therefore, an actual technical protection scope of the present disclosure is to be defined by the technical spirit of the claims.

While this disclosure has been described in connection with what are presently considered to be practical embodiments, it is to be understood that the disclosure is not limited to the disclosed embodiments. On the contrary, it is intended that the disclosure cover various modifications and equivalent arrangements included within the spirit and scope of the appended claims.

DESCRIPTION OF SYMBOLS

200: vehicle speed sensor
210: acceleration sensor
215: controller

What is claimed is:

1. A method for measuring a slope angle of a vehicle, the method comprising:
   determining, by a controller, whether or not a speed of the vehicle is 0 based on a speed signal received from a vehicle speed sensor of the vehicle;
   measuring, by the controller, an extremal value measured first, an extremal value measured second, and an extremal value measured third among extremal values of an output signal of an acceleration sensor detecting a signal corresponding to the slope angle of the vehicle when the speed of the vehicle is 0;
   verifying, by the controller, whether or not the measured three extremal values satisfy conditions of the extremal values based on reference conditions of each of the extremal values;
   estimating, by the controller, a steady state value of the output signal of the acceleration sensor, based on the extremal values measured first and second among the verified three extremal values and a dynamic characteristic parameter of the vehicle or based on the verified three extremal values;
   converting, by the controller, the steady state value into the slope angle of the vehicle, wherein the output signal of the acceleration sensor has a damped free vibration waveform; and
   controlling, by the controller, operation of the vehicle based on the slope angle of the vehicle.

2. The method of claim 1, wherein:
   the controller determines that the reference conditions are satisfied when: a value obtained by subtracting a generation time of the extremal value measured first among the measured three extremal values from a generation time of the extremal value measured second among the measured three extremal values is ½ of a damped free vibration period of the damped free vibration waveform; a value obtained by subtracting a generation time of the extremal value measured second from a generation time of the extremal value measured third among the measured three extremal values is ½ of the damped free vibration period; a magnitude of the extremal value measured first is larger than a magnitude of the extremal value measured second; and the magnitude of the extremal value measured second is larger than a magnitude of the extremal value measured third.

3. The method of claim 1, wherein:
   the controller calculates the dynamic characteristic parameter of the vehicle using the extremal values measured first and second among the verified three extremal values.

4. The method of claim 3, wherein:
   the controller calculates the dynamic characteristic parameter of the vehicle by dividing a magnitude of the extremal value measured second among the verified three extremal values by a magnitude of the extremal value measured first among the verified three extremal values.

5. A device for measuring a slope angle of a vehicle, the device comprising:
   a vehicle speed sensor detecting a speed of the vehicle;
   an acceleration sensor detecting a signal corresponding to the slope angle of the vehicle; and
   a controller determining whether or not the speed of the vehicle is 0 based on a speed signal received from the vehicle speed sensor of the vehicle,
   wherein, when the speed of the vehicle is 0, the controller measures an extremal value measured first, an extremal value measured second, and an extremal value measured third among extremal values of an output signal of the acceleration sensor having a damped free vibration waveform,
   wherein the controller verifies whether or not the measured three extremal values satisfy conditions of the extremal values based on reference conditions of each of the extremal values,
   wherein the controller estimates a steady state value of the output signal of the acceleration sensor, based on the extremal values measured first and second among the verified three extremal values and a dynamic characteristic parameter of the vehicle or based on the verified three extremal values,
   wherein the controller converts the steady state value into the slope angle of the vehicle and
   wherein the controller controls operation of the vehicle based on the slope angle of the vehicle.

6. The device of claim 5, wherein:
   the controller determines that the reference conditions are satisfied when: a value obtained by subtracting a generation time of the extremal value measured first among the measured three extremal values from a generation time of the extremal value measured second among the measured three extremal values is ½ of a damped free vibration period of the damped free vibration waveform; a value obtained by subtracting a generation time of the extremal value measured second from a generation time of the extremal value measured third among the measured three extremal values is ½ of the damped free vibration period; a magnitude of the extremal value measured first is larger than a magnitude of the extremal value measured second; and the magnitude of the extremal value measured second is larger than a magnitude of the extremal value measured third.

7. The device of claim 5, wherein:
the controller calculates the dynamic characteristic parameter of the vehicle using the extremal values measured first and second among the verified three extremal values.

8. The device of claim 7, wherein:
the controller calculates the dynamic characteristic parameter of the vehicle by dividing a magnitude of the extremal value measured second among the verified three extremal values by a magnitude of the extremal value measured first among the verified three extremal values.

\* \* \* \* \*